US006928969B2

(12) United States Patent
Bloms et al.

(10) Patent No.: US 6,928,969 B2
(45) Date of Patent: Aug. 16, 2005

(54) SYSTEM AND METHOD FOR CONTROLLING ENGINE OPERATION

(75) Inventors: Jason Kenneth Bloms, Peoria, IL (US); James J. Faletti, Spring Valley, IL (US); Scott Alan Leman, Eureka, IL (US); David Andrew Pierpont, Peoria, IL (US); James Richard Weber, Lacon, IL (US)

(73) Assignee: Caterpillar Inc, Peoria, IL (US)

( * ) Notice: Subject to any disclaimer, the term of this patent is extended or adjusted under 35 U.S.C. 154(b) by 26 days.

(21) Appl. No.: 10/144,145

(22) Filed: May 14, 2002

(65) Prior Publication Data
US 2003/0213449 A1 Nov. 20, 2003

(51) Int. Cl.[7] ................................. F01L 1/34
(52) U.S. Cl. ................ 123/90.16; 123/90.15; 123/320
(58) Field of Search .............. 123/90.15–90.17, 123/90.31, 320–322; 74/568 R; 464/2, 160, 1

(56) References Cited

U.S. PATENT DOCUMENTS

| 3,250,068 | A |   | 5/1966 | Vulliamy |
| 4,084,557 | A |   | 4/1978 | Luria |
| 4,138,973 | A |   | 2/1979 | Luria |
| 4,174,683 | A | * | 11/1979 | Vivian ............... 123/48 C |
| 4,424,790 | A |   | 1/1984 | Curtil |
| 4,426,985 | A |   | 1/1984 | Kanesaka |
| 4,561,253 | A |   | 12/1985 | Curtil |
| 4,794,892 | A |   | 1/1989 | Konno |

(Continued)

FOREIGN PATENT DOCUMENTS

| GB | 2018352 A | 10/1979 |
| JP | 61106918  | 5/1986  |

(Continued)

OTHER PUBLICATIONS

Notice of Allowance and Allowability for U.S. Appl. No. 10/144,131, mailed Jan. 25, 2005.

(Continued)

Primary Examiner—Thomas Denion
Assistant Examiner—Jaime W Corrigan
(74) Attorney, Agent, or Firm—Finnegan, Henderson, Farabow, Garrett & Dunner

(57) ABSTRACT

A method of controlling an engine is provided. At least one operating parameter of the engine is sensed. The engine is operated in a first mode in response to the sensed operating parameter being at one of a predetermined first set of conditions. In the first mode, a cam assembly moves an intake valve from a first position when a piston starts an intake stroke and the cam assembly returns the intake valve to the first position when the piston completes the intake stroke. The engine is operated in a second mode in response to the sensed operating parameter being at one of a predetermined second set of conditions. In the second mode, the cam assembly moves the intake valve from the first position when the piston starts an intake stroke and an actuator prevents the intake valve from returning to the first position in response to the cam assembly.

42 Claims, 6 Drawing Sheets

U.S. PATENT DOCUMENTS

| | | | |
|---|---|---|---|
| 4,815,423 A | | 3/1989 | Holmer |
| 4,869,222 A | | 9/1989 | Klassen |
| 5,233,948 A | | 8/1993 | Boggs et al. |
| 5,255,637 A | | 10/1993 | Schechter |
| 5,408,979 A | | 4/1995 | Backlund et al. |
| 5,427,078 A | | 6/1995 | Hitomi et al. |
| 5,445,128 A | | 8/1995 | Letang et al. |
| 5,469,818 A | | 11/1995 | Yoshioka et al. |
| 5,553,573 A | * | 9/1996 | Hara et al. ............... 123/90.15 |
| 5,576,963 A | | 11/1996 | Ribbens et al. |
| 5,590,626 A | | 1/1997 | Hitomi et al. |
| 5,622,144 A | * | 4/1997 | Nakamura et al. ....... 123/90.15 |
| 5,682,854 A | | 11/1997 | Ozawa |
| 5,775,283 A | | 7/1998 | Sawai et al. |
| 5,857,437 A | | 1/1999 | Yoshioka |
| 5,927,075 A | | 7/1999 | Khair |
| 5,992,361 A | | 11/1999 | Murata et al. |
| 5,996,558 A | * | 12/1999 | Ouellette et al. ........... 123/506 |
| 6,006,706 A | | 12/1999 | Kanzaki |
| 6,021,758 A | | 2/2000 | Carey et al. |
| 6,026,786 A | | 2/2000 | Groff et al. |
| 6,082,328 A | | 7/2000 | Meistrick et al. |
| 6,138,620 A | * | 10/2000 | Nemoto et al. .......... 123/90.11 |
| 6,170,441 B1 | | 1/2001 | Haldeman et al. |
| 6,209,516 B1 | | 4/2001 | Yamashita |
| 6,237,551 B1 | | 5/2001 | Macor et al. |
| 6,267,107 B1 | | 7/2001 | Ward |
| 6,273,076 B1 | | 8/2001 | Beck et al. |
| 6,279,550 B1 | | 8/2001 | Bryant |
| 6,301,887 B1 | | 10/2001 | Gorel et al. |
| 6,301,889 B1 | | 10/2001 | Gladden et al. |
| 6,302,076 B1 | | 10/2001 | Bredy |
| 6,467,452 B1 | | 10/2002 | Duffy et al. |
| 6,571,765 B2 | | 6/2003 | Kuboshima et al. |
| 6,651,618 B1 | | 11/2003 | Coleman et al. |
| 6,688,280 B2 | | 2/2004 | Weber et al. |
| 2002/0013653 A1 | | 1/2002 | Ohyama et al. |
| 2002/0026913 A1 | | 3/2002 | Ariga |
| 2002/0046741 A1 | | 4/2002 | Kakuho et al. |
| 2002/0177938 A1 | | 11/2002 | Sellnau et al. |
| 2003/0164163 A1 | | 9/2003 | Lei et al. |
| 2003/0183185 A1 | | 10/2003 | Sun et al. |

FOREIGN PATENT DOCUMENTS

| | | |
|---|---|---|
| JP | 05-106415 A2 | 4/1993 |
| JP | 08158901 | 6/1996 |
| JP | 2000-120457 A | 4/2000 |
| JP | 2000-145484 A | 5/2000 |
| WO | WO 95/24549 | 9/1995 |
| WO | WO 98/02653 | 1/1998 |

OTHER PUBLICATIONS

Interview Summary for U.S. Appl. No. 10/144,131, dated Sep. 29, 2004.

Office Action for U.S. Appl. No. 10/144,131, dated Jul. 7, 2004.

Office Action for U.S. Appl. No. 10/144,131, mailed Feb. 12, 2004.

Office Action for U.S. Appl. No. 10/144,131, mailed Aug. 27, 2003.

Office Action for U.S. Appl. No. 10/144,131, mailed Apr. 8, 2003.

Specification for U.S. Appl. No. 10/144,131, filed May 14, 2002, pp. 1–25.

Edwards et al., "The Potential of a Combined Miller Cycle and Internal EGR Engine for Future Heavy Duty Truck Applications," The Engineering Society for Advancing Mobility Land Sea Air and Space International, International Congress and Exposition, Feb. 23–26, 1998, pp. 1–19.

Obert, "Internal Combustion Engines and Air Pollution," Based on *Internal Combustion Engines*, Third Edition, 1973, pp. 612–614.

Challen et al., "Diesel Engine Reference Book," Second Edition, SAE International, 1999, pp. 75, 81, 84, 146, and 263–305.

Yorihiro Fukuzawa et al., "Development of High Efficiency Miller Cycle Gas Engine" Mitsubishi Heavy Industries, Ltd., Technical Review, vol. 38, No. 3, Oct. 2001, pp. 146–150.

Request for *Inter Partes* Reexamination Transmittal Form for U.S. Pat. No. 6,688,280, and Attachment to Request for *Inter Partes* Reexamination Transmittal Form, Sep. 17, 2004 (15 pages).

Request for *Inter Partes* Reexamination Transmittal Form for U.S. Pat. No. 6,651,618, and Attachment to Request for *Inter Partes* Reexamination Transmittal Form, Aug. 27, 2004 (11 pages).

http://www.mazda.com.au/corpora/209.html, Oct. 16, 2001, (6 pages).

* cited by examiner

SYSTEM AND METHOD FOR CONTROLLING ENGINE OPERATION

TECHNICAL FIELD

The present invention is directed to a system and method for controlling the operation of an engine. More particularly, the present invention is directed to a system and method for controlling the actuation timing of engine valves.

BACKGROUND

The operation of an internal combustion engine, such as, for example, a diesel, gasoline, or natural gas engine, may cause the generation of undesirable emissions. These emissions, which may include particulates and oxides of nitrogen (NOx), are generated when fuel is combusted in a combustion chamber of the engine. An exhaust stroke of an engine piston forces exhaust gas, which may include these emissions from the engine. If no emission reduction measures are in place, these undesirable emissions will eventually be exhausted to the environment.

Research is currently being directed towards decreasing the amount of undesirable emissions that are exhausted to the environment during the operation of an engine. It is expected that improved engine design and improved control over engine operation may lead to a reduction in the generation of undesirable emissions. Many different approaches, such as, for example, exhaust gas recirculation, water injection, fuel injection timing, and fuel formulations, have been found to reduce the amount of emissions generated during the operation of an engine. After treatments, such as, for example, traps and catalysts have been found to effectively remove emissions from an exhaust flow. Unfortunately, the implementation of these emission reduction approaches typically results in a decrease in the overall efficiency of the engine.

Additional efforts are being focused on improving engine efficiency to compensate for the efficiency loss due to the emission reduction systems. One such approach to improving the engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation. As described in U.S. Pat. No. 6,237,551 to Macor et al., issued on May 29, 2001, a "late intake" Miller cycle may be implemented in such a cam arrangement by modifying the shape of the cam to overlap the actuation of the intake valve with the start of the compression stroke of the piston.

However, while valve actuation timing adjustments may provide efficiency benefits, these actuation timing adjustments may also result in detrimental engine performance under certain operating conditions. For example, a late intake Miller cycle may be inefficient when the engine is starting, operating under cold conditions, or experiencing a transient condition, such as a sudden increase in engine load. This detrimental engine performance is caused by a decrease in the mass of air flowing through the engine. Especially under cold ambient conditions, the delayed start of compression may lead to insufficient cylinder temperatures to support good combustions and startability.

As noted above, the actuation timing of a valve system driven by a cam arrangement is determined by the shape of the driving cam. Because the shape of the cam is fixed, this type of arrangement is inflexible and may only be changed during the operation of the engine through the use of complex mechanical mechanisms.

The engine operation control system and method of the present invention solves one or more of the problems set forth above.

SUMMARY OF THE INVENTION

In one aspect, the present invention is directed to a method of operating an engine that has a cylinder, an intake valve associated with the cylinder and moveable between a first position where the intake valve prevents a flow of fluid to the cylinder and a second position where the intake valve allows a flow of fluid to the cylinder, a cam assembly connected to the intake valve to move the intake valve between the first and second positions, and an actuator connected to the intake valve. At least one operating parameter of the engine is sensed. The engine is operated in a first mode in response to the sensed operating parameter being at one of a predetermined first set of conditions. In the first mode, the cam assembly begins to move the intake valve from the first position toward the second position when the piston is at or near a top dead center position of an intake stroke and the cam assembly returns the intake valve to the first position when the piston is at or near a bottom dead center position of the intake stroke. The engine is operated in a second mode in response to the sensed operating parameter being at one of a predetermined second set of conditions. In the second mode, the cam assembly begins to move the intake valve from the first position toward the second position when the piston is at or near a top dead center position of an intake stroke and the actuator prevents the intake valve from returning to the first position in response to the cam assembly.

In another aspect, the present invention is directed to an engine that includes an engine block defining a cylinder. A piston is slidably disposed within the cylinder and is moveable between a top dead center position and a bottom dead center position. An intake valve is operatively associated with the cylinder and is moveable between a first position where the intake valve prevents fluid from flowing to the cylinder and a second position where a flow of fluid is allowed to enter the cylinder. A cam assembly is connected to the intake valve to move the intake valve between the first and second positions. An actuator is configured to selectively prevent the intake valve from returning to the first position. A sensor is configured to sense at least one operating parameter of the engine. A controller is operable to selectively operate the engine in a first mode or a second mode based on the sensed operating parameter. In the first mode, the cam assembly begins to move the intake valve from the first position toward the second position when the piston is at or near the top dead center position of an intake stroke and the cam assembly returns the intake valve to the first position when the piston is at or near a bottom dead center position of the intake stroke. In the second mode, the cam assembly begins to move the intake valve from the first position toward the second position when the piston is at or near the top dead center position of an intake stroke and the actuator prevents the intake valve from returning to the first position in response to the cam assembly.

DETAILED DESCRIPTION

Figure 1:
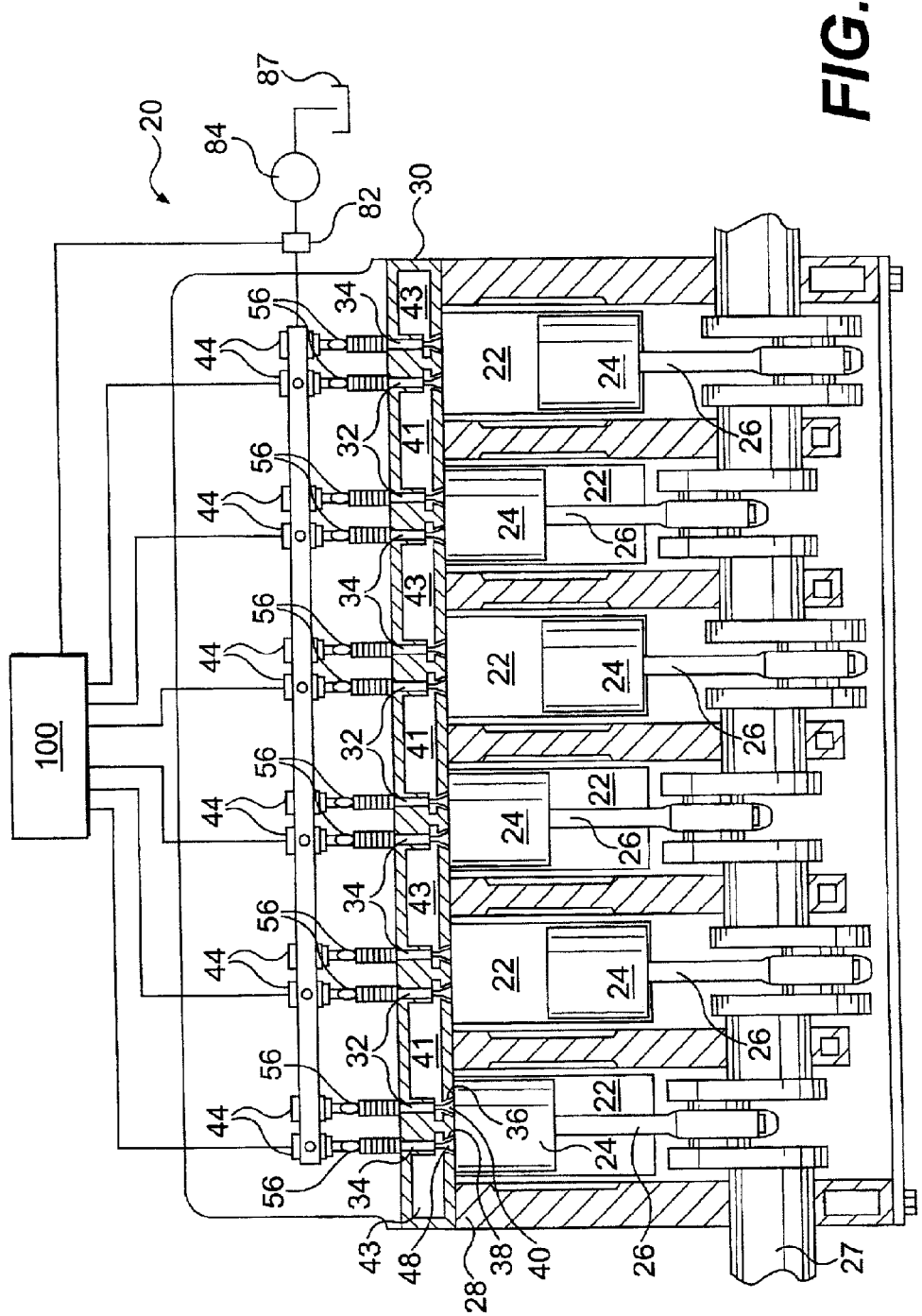
FIG. 1 is a diagrammatic cross-sectional view of an exemplary embodiment of an internal combustion engine.

An exemplary embodiment of an internal combustion engine 20 is illustrated in FIG. 1. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 1, engine 20 includes an engine block 28 that defines a plurality of cylinders 22. A piston 24 is slidably disposed within each cylinder 22. In the illustrated embodiment, engine 20 includes six cylinders 22 and six associated pistons 24. One skilled in the art will readily recognize that engine 20 may include a greater or lesser number of pistons 24 and that pistons 24 may be disposed in an "in-line" configuration, a "V" configuration, or any other conventional configuration.

As also shown in FIG. 1, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will result in a sliding motion of piston 24 between a top dead center position and a bottom dead center position within cylinder 22.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to move or "lift" valve element 40 from a first, or closed, position where valve element 40 prevents a flow of fluid through the respective intake port 36 to a second, or open, position where valve element 40 allows a flow of fluid through the respective intake port 36. The intake valves 32 for each cylinder 22 may be actuated in unison or independently.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to lift valve element 48 to thereby open the respective exhaust port 38. The exhaust valves 34 for each cylinder 22 may be actuated in unison or independently.

Figure 2:
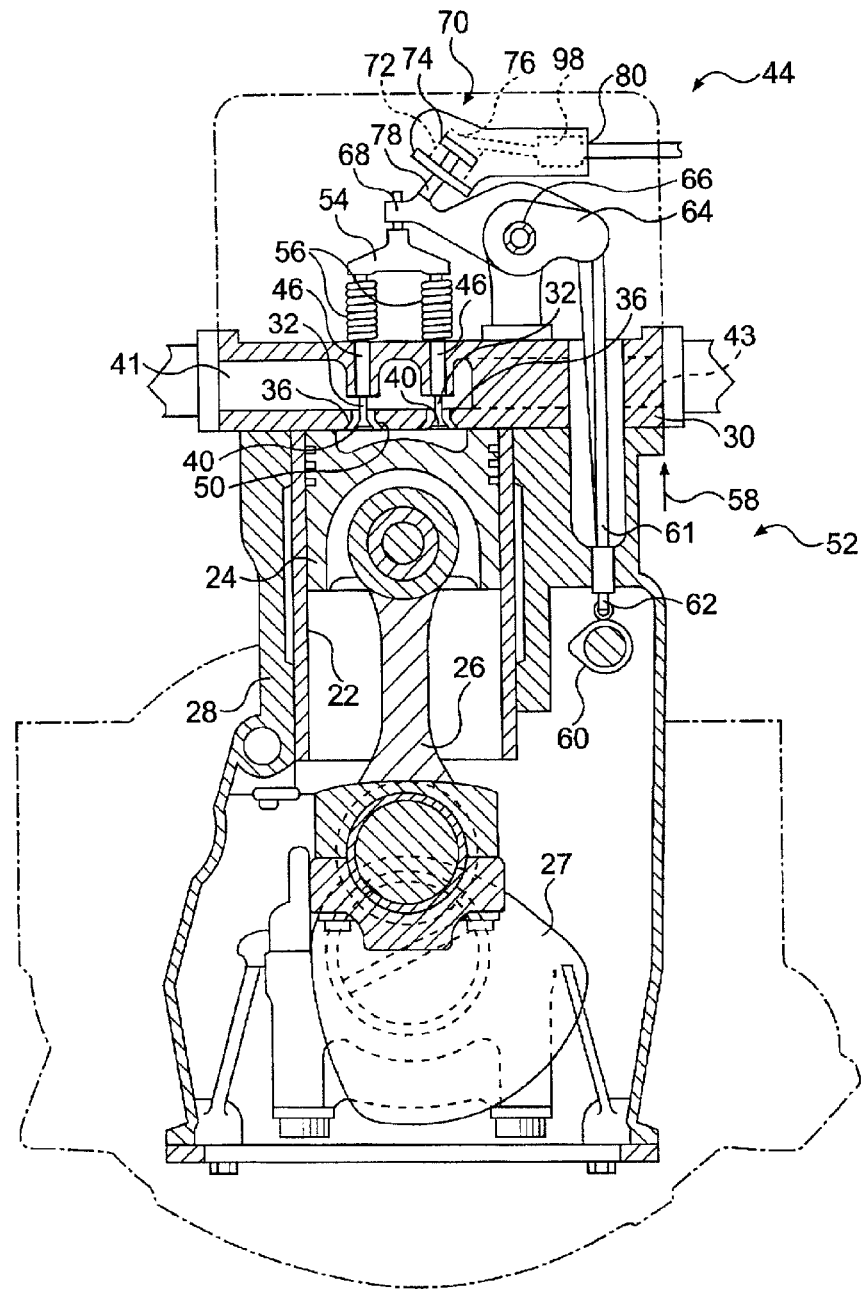
FIG. 2 is a diagrammatic cross-sectional view of a cylinder and valve actuation assembly in accordance with an exemplary embodiment of the present invention.

FIG. 2 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and blocks fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 1) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22, When exhaust valve 34 is lifted from the closed position, exhaust valve 32 allows a flow of fluid relative to cylinder 22.

As also shown in FIG. 1, a series of valve actuation assemblies 44 are operatively associated with each intake valve 32 and exhaust valve 34. Each valve actuation assembly 44 is operable to open the associated intake valve 32 or exhaust valve 34. In the following exemplary description, valve actuation assembly 44 is driven by a combination of a cam assembly 52 and a fluid actuator 70. One skilled in the art will recognize, however, that valve actuation assembly 44 may be driven by through other types of systems, such as, for example, a hydraulic actuation system, an electronic solenoid system, or any combination thereof.

In the exemplary embodiment of FIG. 2, valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 also includes a rocker arm 64. Rocker arm 64 is configured to pivot about a pivot 66. One end 68 of rocker arm 64 is connected to bridge 54. The opposite end of rocker arm 64 is connected to a cam assembly 52. In the exemplary embodiment of FIG. 2, cam assembly 52 includes a cam 60 having a cam lobe and mounted on a cam shaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear reduction assembly (not shown). As one skilled in the art will recognize, a rotation of cam 60 will cause cam follower 62 and associated push rod 61 to periodically reciprocate between a first, or upper, position and a second, or lower, position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 moves towards a bottom dead center position within cylinder 22 to allow air to flow from intake passageway 41 into cylinder 22.

A similar valve actuation assembly 44 may be connected to exhaust valves 34. A second cam (not shown) may be connected to crankshaft 27 to control the actuation timing of exhaust valves 34. Exhaust valves 34 may be actuated to open exhaust ports 38 when piston 24 is moving towards a top dead center position within cylinder 22 to allow exhaust to flow from cylinder 22 into exhaust passageway 43.

As shown in FIG. 2, valve actuation assembly 44 also includes a fluid actuator 70. Fluid actuator 70 includes an actuator cylinder 72 that defines an actuator chamber 76. An actuator piston 74 is slidably disposed within actuator cylinder 72 and is connected to an actuator rod 78. A return spring (not shown) may act on actuator piston 74 to return actuator piston 74 to a home position. Actuator rod 78 is engageable with an end 68 of rocker arm 64.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64. Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

Figure 3:
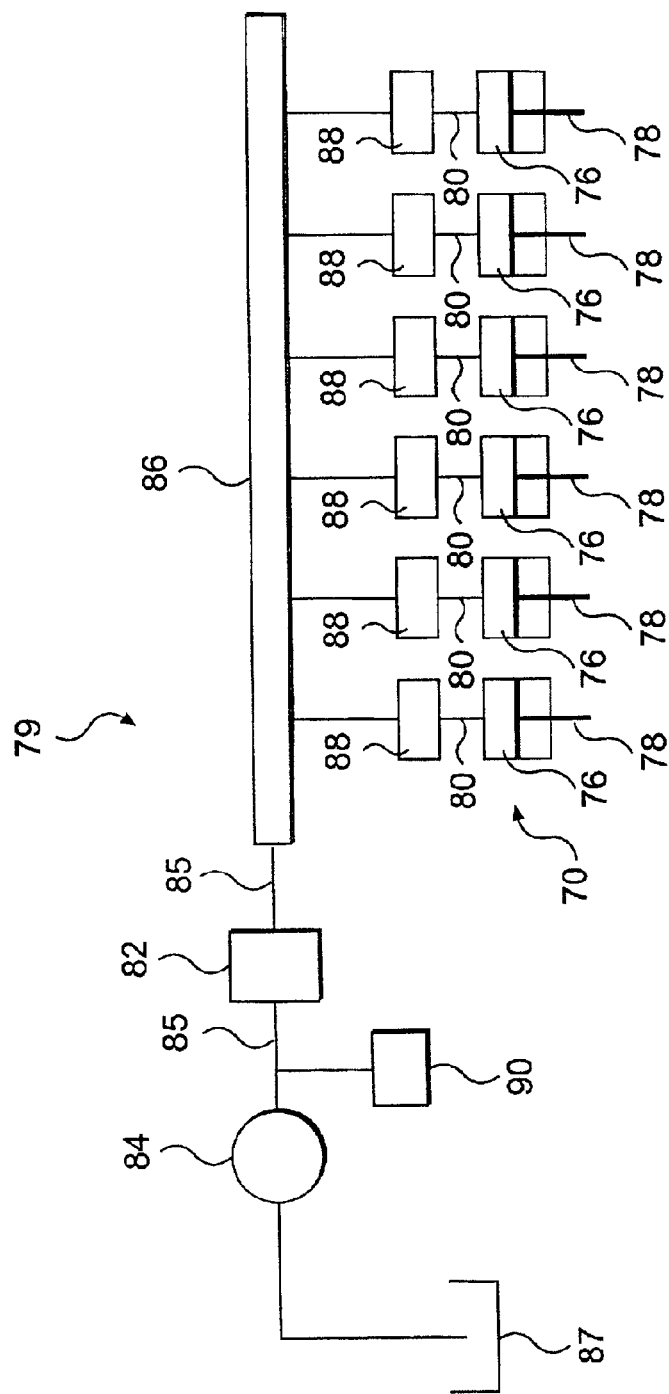
FIG. 3 is a schematic and diagrammatic representation of a fluid supply system for a fluid actuator for an engine valve in accordance with an exemplary embodiment of the present invention.

As illustrated in FIGS. 1 and 3, a source of low pressure fluid 84 is provided to draw fluid from a tank 87 and to supply pressurized fluid to fluid actuator 70. Tank 87 may contain any type of fluid readily apparent to one skilled in the art, such as, for example, hydraulic fluid, fuel, or transmission fluid. Source of low pressure fluid 84 may be part of a lubrication system, such as typically accompanies an internal combustion engine. Such a lubrication system may provide pressurized oil having a pressure of, for example, less than 700 KPa (100 psi) or, more particularly, between about 410 KPa and 620 KPa (60 psi and 90 psi).

Alternatively, the source of fluid may be a pump configured to provide oil at a higher pressure, such as, for example, between about 10 MPa and 35 MPa (1450 psi and 5000 psi).

A fluid supply system 79 connects source of low pressure fluid 84 with fluid actuator 70. In the exemplary embodiment of FIG. 3, source of low pressure fluid 84 is connected to a fluid rail 86 through fluid line 85. A control valve 82 is disposed in fluid line 85. Control valve 82 may be opened to allow pressurized fluid to flow from source of low pressure fluid 84 to fluid rail 86. Control valve 82 may be closed to prevent pressurized fluid from flowing from source of low pressure fluid 84 to fluid rail 86.

As illustrated in FIG. 3, fluid rail 86 supplies pressurized fluid from source of low pressure fluid 84 to a series of fluid actuators 70. Each fluid actuator 70 may be associated with either the intake valves 32 or the exhaust valves 34 of a particular engine cylinder 22 (referring to FIG. 1). Fluid lines 80 direct pressurized fluid from fluid rail 86 into the actuator chamber 76 of each fluid actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

One skilled in the art will recognize that fluid supply system 79 may have a variety of different configurations. For example, as illustrated in FIG. 4a, fluid supply system 79 may include a check valve 94 placed in parallel with directional control valve 88 between control valve 82 and fluid actuator 70. Check valve 94 may be configured to allow fluid to flow in the direction from control valve 82 to fluid actuator 70.

As also shown in FIG. 4a, fluid supply system 79 may include an air bleed valve 96. Air bleed valve 96 may be any device readily apparent to one skilled in the art as capable of allowing air to escape a hydraulic system. For example, air bleed valve 96 may be a spring biased ball valve that allows air to flow through the valve, but closes when exposed to fluid pressure.

In addition, a snubbing valve 98 may be disposed in fluid line 81 leading to actuator chamber 76. Snubbing valve 98 may be configured to restrict the flow of fluid through fluid line 81. For example, snubbing valve 98 may be configured to decrease the rate at which fluid exits actuator chamber 76 to thereby slow the rate at which intake valve 32 closes.

Fluid supply system 79 may also include an accumulator 95. A restrictive orifice 93 may be disposed in the inlet to accumulator 95. As described in greater detail below, the combination of accumulator 95 and restrictive orifice 93 act to dampen oscillations in actuator chamber 76 and fluid line 80, which may cause actuator piston 74 to oscillate.

Figure 4B:
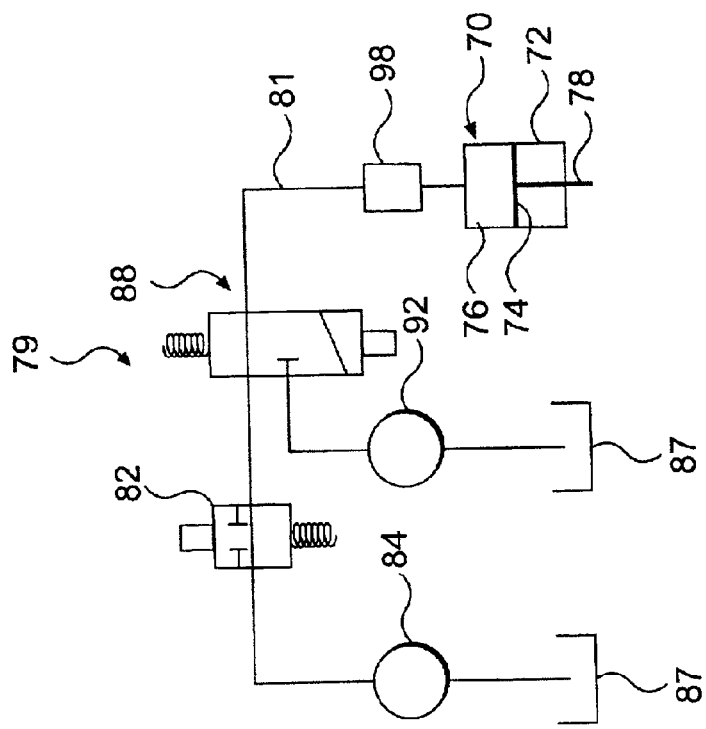
FIG. 4b is a schematic and diagrammatic representation of a fluid supply system for a fluid actuator in accordance with another exemplary embodiment of the present invention.
Figure 4A:
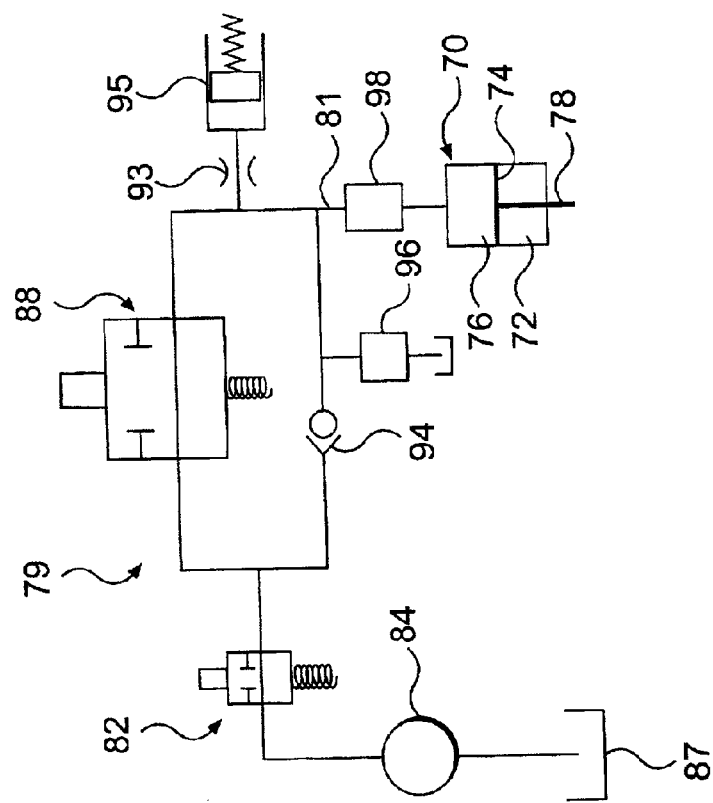
FIG. 4a is a schematic and diagrammatic representation of a fluid supply system for a fluid actuator in accordance with another exemplary embodiment of the present invention.

Another exemplary embodiment of a fluid supply system 79 is illustrated in FIG. 4b. As shown, fluid supply system 79 includes a source of high pressure fluid 92. Directional control valve 88 is configured to selectively connect either source of low pressure fluid 84 or source of high pressure fluid 92 with fluid line 81. In this manner, either low or high pressure fluid may be directed to fluid actuator 70 to meet the needs of the current operating conditions. Directional control valve 88 may be normally biased into a position where source of low pressure fluid 84 is connected with fluid line 81.

As shown in FIG. 1, a controller 100 is connected to each valve actuation assembly 44 and to control valve 82. Controller 100 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 100 may be programmed to control one or more aspects of the operation of engine 20. For example, controller 100 may be programmed to control valve actuation assembly 44, the fuel injection system, and any other engine function commonly controlled by an electronic control module. Controller 100 may control engine 20 based on the current operating conditions of the engine and/or instructions received from an operator.

Controller 100 may be further programmed to receive information from one or more sensors operatively connected with engine 20. Each of the one or more sensors may be configured to sense an operating parameter of engine 20. For example, with reference to FIG. 3, a sensor 90 may be connected with fluid supply system 79 to sense the temperature of the fluid within fluid supply system 79. One skilled in the art will recognize that many other types of sensors may be used in conjunction with or independently of sensor 90. For example, engine 20 may be equipped with sensors configured to sense one or more of the following: the temperature of the engine coolant, the surface temperature of the engine, the ambient air temperature, the intake air temperature, the rotational speed of the engine, the load on the engine, the amount and/or rate of fuel supplied to the engine, the intake air pressure, the oil temperature, a combustion chamber pressure, the exhaust emissions, and the exhaust temperature.

Engine 20 may be further equipped with a sensor configured to monitor the crank angle of crankshaft 27. The position of pistons 24 within their respective cylinders 22 may be determined by the crank angle of crankshaft 27. As one skilled in the art will recognized, a piston in a conventional four-stroke diesel cycle reciprocates between a top dead center position and a bottom dead center position through a combustion stroke, an exhaust stroke, an intake stroke, and a compression stroke. Each piston stroke correlates to about 180° of crankshaft rotation. Thus, piston 24 may begin combustion stroke at about 0°, the exhaust stroke at about 180°, the intake stroke at about 360°, and the compression stroke at about 540°.

Figure 5:
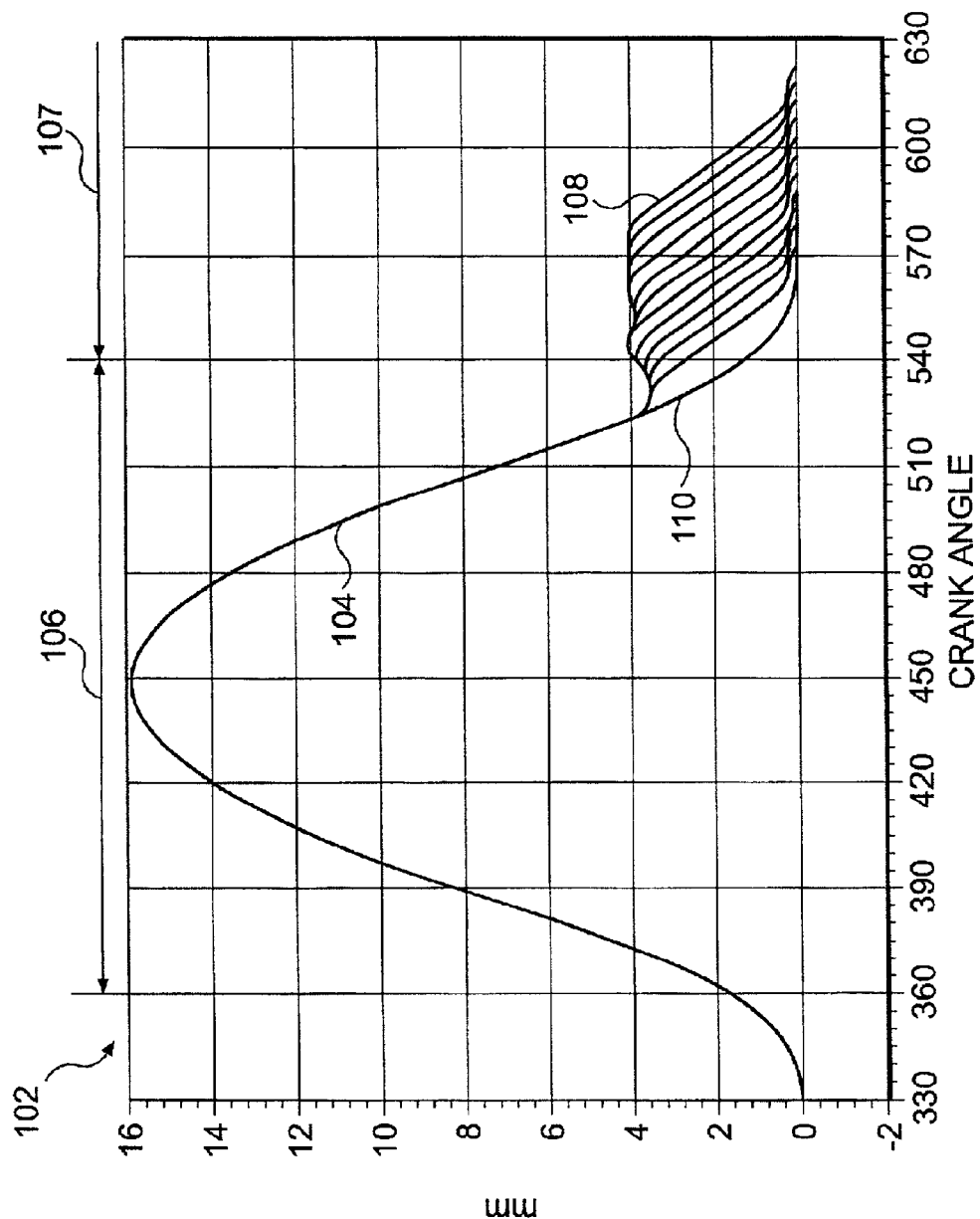
FIG. 5 is a graphic illustration of an exemplary intake valve actuation as a function of engine crank angle in accordance with the present invention.

The crank angle of crankshaft 27 is also related to actuation timing of intake valves 32 and exhaust valves 34. An exemplary graph 102 indicating the relationship between an intake valve actuation 104 and crankshaft 27 crank angle is illustrated in FIG. 5. As shown, intake valve 32 begins to open at about 360° of crankshaft rotation, i.e. when piston 24 is at or near a top dead center position of an intake stroke 106.

Figure 6:
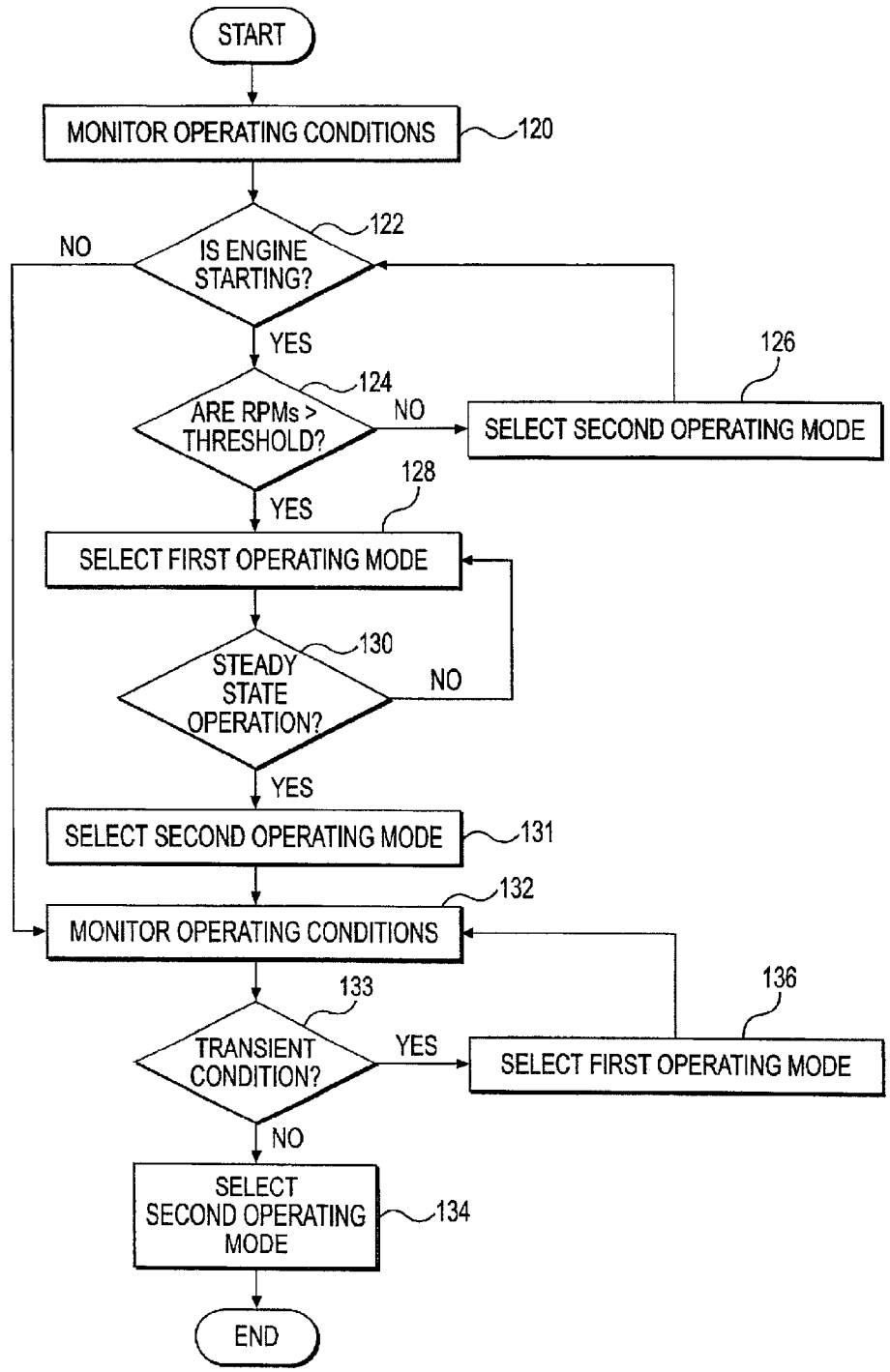
FIG. 6 is a flowchart illustrating an exemplary method of controlling the operation of an engine in accordance with the present invention.

Controller 100 may adjust the actuation timing of intake valves 32 based on information received from the sensors regarding the current operating conditions of engine 20. An exemplary method of controlling the operation of engine 20 is illustrated in FIG. 6. It should be understood that various modifications may be made to the exemplary method without departing from the scope of the present invention.

Industrial Applicability

Based on information provided by the engine sensors, controller 100 may operate engine 20 in either a first mode of operation or a second mode of operation. In the first mode of operation, intake valve 32 actuation is controlled to implement a conventional four-stroke diesel cycle. In the second mode of engine operation, intake valve 32 actuation is controlled to implement a "late intake" type Miller cycle.

An exemplary intake valve 32 actuation is illustrated in FIG. 5. As shown, cam assembly 52 begins to open intake valves 32 when piston 24 is starting intake stroke 106, i.e. when piston 24 is at or near a top dead center position within cylinder 22. As will be recognized by one skilled in the art, intake ports 36 will not be completely open until intake valves 32 are lifted a certain distance, for example, approximately 2 mm. During this portion of the lift of intake valves 32, valve elements 40 begin to disengage valve seats 50 to start opening intake ports 36. To ensure that intake ports 36 are completely open when piston 24 begins intake stroke 106, the actuation or lift of intake valves 32 may begin slightly before the start of intake stroke 106. In exemplary actuation of FIG. 5, intake valve actuation begins approximately 30° before the start of intake stroke 106. This will ensure that intake ports 36 are completely open when piston 24 starts intake stroke 106.

Controller 100 implements the second mode of operation by selectively actuating fluid actuator 70 to hold intake valve 32 open for at least a portion of the compression stroke 107 of piston 24. This may be accomplished by moving control valve 82 and directional control valve 88 to the open positions before piston 24 starts intake stroke 106. This allows pressurized fluid to flow from source of low pressure fluid 84 through fluid rail 86 and into actuator chamber 76. The force of the fluid entering actuator chamber 76 moves actuator piston 74 so that actuator rod 78 follows end 68 of rocker arm 64 as rocker arm 64 pivots to open intake valves 32. The distance and rate of movement of actuator rod 78 will depend upon the configuration of actuator chamber 76 and fluid supply system 79. When actuator chamber 76 is filled with fluid and rocker arm 64 returns intake valves 32 from the open position to the closed position, actuator rod 78 will engage end 68 of rocker arm 64.

Fluid supply system 79 may be configured to supply a flow rate of fluid to fluid actuator 70 to fill actuator chamber 76 before cam 60 returns intake valves 32 to the closed position. In the embodiment of fluid supply system 79 illustrated in FIG. 4a, pressurized fluid may flow through both directional control valve 88 and check valve 94 into actuator chamber 76. Alternatively, directional control valve 88 may remain in a closed position and fluid may flow through check valve 94 into actuator cylinder 76.

When actuator chamber 76 is filled with fluid, controller 100 may close directional control valve 88. This prevents fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the trapped fluid in actuator chamber 76 will prevent springs 56 from returning intake valves 32 to the closed position. Thus, fluid actuator 70 will hold intake valves 32 in the open position, independently of the action of cam assembly 52.

When actuator rod 78 engages rocker arm 64 to prevent intake valves 32 from closing, the force of springs 56 acting through rocker arm 64 may cause an increase in the pressure of the fluid within fluid system 79. In response to the increased pressure, fluid will flow through restricted orifice 93 into accumulator 95. Restricted orifice 93 will limit the amount of fluid that may flow into accumulator 95. In this manner, the combination of restricted orifice 93 and accumulator 95 acts to damper any oscillations that may result from the engagement of actuator rod 78 with rocker arm 64.

Controller 100 may close intake valves 32 by opening directional control valve 88. This allows the pressurized fluid to flow out of actuator chamber 76. The force of springs 56 forces the fluid from actuator chamber 76, thereby allowing actuator piston 74 to move within actuator cylinder 72. This allows rocker arm 64 to pivot so that intake valves 32 are moved to the closed position. Snubbing valve 98 may restrict the rate at which fluid exits actuator chamber 76 to reduce the velocity at which intake valves 32 are closed. This may prevent valve elements 40 from being damaged when closing intake ports 36.

Controller 36 may open directional control valve 88 to coordinate the closing of intake valves 32 with the motion of piston 24. As illustrated in FIG. 5, a late intake closing 108 occurs when intake valves 32 remain open for at least a portion of a compression stroke 107 of piston 24. As also illustrated in FIG. 5, the intake valve 32 is held at an intermediate position for this determined period of time, the intermediate position being between the fully open intake valve position and the closed intake valve position. The late closing allows some of the air in cylinder 22 to be forced out of cylinder 22 as piston 24 advances in cylinder 24 during compression stroke 107. The amount of air allowed to escape cylinder 22 may be controlled by adjusting the crank angle at which intake valves 32 are closed. Closing intake valves 32 at a relatively earlier crank angle decreases the amount of escaping air, while closing intake valves 32 at a relatively later crank angle increases the amount of escaping air. As described in greater detail below, intake valves 32 may be held open for the entire compression stroke 107.

In the first mode of operation, the intake valve 32 actuation is controlled to implement a conventional 4 stroke diesel cycle. Controller 100 may disengage the late intake Miller cycle by closing control valve 82. Closing control valve 82 prevents fluid from flowing from source of low pressure fluid 84 into actuator chamber 76. Without the introduction of fluid to actuator chamber 76, fluid actuator 70 will not prevent intake valves 32 from returning to the closed position. Thus, the actuation of intake valves 32 will be governed by the shape and orientation of cam 60.

Thus, when control valve 82 is closed, intake valves 32 may follow a conventional diesel cycle as governed by cam 60. As shown in FIG. 5, intake valve actuation 106 will follow a conventional closing 110. In conventional closing 110, the closing of intake valves 32 substantially coincides with the end of the intake stroke of piston 24. One skilled in the art will recognize that valve elements 40 will begin to engage valve seats 50 and close intake ports 36 at approximately the end of intake stroke 106. In conventional closing 110, intake valves 32 may continue to move after piston 24 starts compression stroke 107. However, this continued motion ensures that valve elements 40 are fully engaged with valve seats 50. For the purposes of the present disclosure, intake valves 32 may be considered closed when valve elements 40 begin to engage valve seats 50. It is expected that the initial engagement of valve elements 40 with valve seats 50 will occur within approximately 5° to 20° of a bottom dead center position of intake stroke 106.

When intake valves 32 close at the end of intake stroke 106, little or no air will be forced from cylinder 22 during the compression stroke. This results in an increased compression ratio in cylinder 22 and in an increased air flow through engine 20 relative to the second mode of engine operation. The increased compression ratio and the increased air flow allows for increased fuel rate which will result in increased power generated by engine 20.

The flowchart of FIG. 6 illustrates an exemplary method of controlling the operation of engine 20. Controller 100 monitors the operating conditions of engine 20 based on sensory input from the sensors operatively engaged with engine 20. Controller 100 will operate engine 20 in the first mode of operation when engine 20 is experiencing a first set of operating conditions and will operate engine 20 in the second mode of operation when engine 20 is experiencing a second set of operating conditions. As described in greater detail below, the first set of operating conditions may include, for example, engine starting and transient conditions. The second set of operating conditions may include, for example, engine cranking and steady state engine operation.

Referring to FIG. 6, controller 100 monitors the operating conditions of engine 20. (Step 120). Controller 100 may determine that engine 20 is in the process of starting. (Step 122). Controller 100 then identifies the rotational speed of crankshaft 27.

One skilled in the art will recognize that an external power source, such as, for example, a battery-powered starter motor, is used to accelerate crankshaft 27 to a certain rotational speed, such as, for example, 150 to 170 rpm, before fuel is introduced to cylinders 22 to start engine 20. If controller 100 determines that crankshaft 27 is rotating at a speed less than this threshold (step 124), controller 100 may select the second mode of operation (step 126).

In the second mode of operation, intake valves 32 are opened for a portion of the compression stroke 107 and less work is required to rotate crankshaft 27. Thus, by selecting the second mode of operation during the cranking or initial acceleration of crankshaft 27, the amount of work required to accelerate crankshaft 27 is reduced. Accordingly, a smaller starter motor and/or battery may be required to crank engine 20. When engine 20 is cranking, the amount of work required to accelerate crankshaft 27 may be further reduced by holding intake valves 32 open until the end of compression stroke 107. In this manner, very little work will be required to accelerate crankshaft 27.

If controller 100 determines that crankshaft 27 is rotating at an appropriate starting speed, controller 100 may initiate fuel delivery to cylinders 22 and operate engine 20 in the first mode of operation. (Step 128). In the first mode of operation, intake valves 32 are closed at the end of intake stroke 106, which results in a greater compression ratio within cylinder 22. The increased compression ration will facilitate the starting of engine 20, particularly in cold conditions.

Controller 100 will continue to monitor engine 20 to determine when engine 20 has started and entered a steady-state operation. (Step 130). When engine 20 has achieved a steady-state operation, controller 100 will operate engine 20 in the second operating mode. (Step 131). In the second operating mode, engine 20 will operate on the late intake Miller cycle.

Controller 100 will continue to monitor the operating conditions of engine 20. (Step 132). Controller 100 will identify a transient condition in engine operation. (Step 133). A transient condition may be experienced when the load on engine 20 is increased, such as, for example, during a rapid acceleration. Controller 100 may identify the transient condition by monitoring various engine parameters, as described previously.

When engine 20 is experiencing a transient condition, controller will operate engine 20 in the first operating mode. (Step 136). As described previously, in the first operating mode, engine 20 has a higher compression ratio and generates a greater flow of air through the engine. The greater air flow may allow engine 20 to generate additional power and may improve the function of auxiliary engine systems, such as, for example, a turbocharger. Thus, the first operating mode will allow engine 20 to meet the increased load. When the transient condition has been satisfied, controller 100 may return engine 20 to the second operating mode. (Step 134).

It should be noted that controller 100 may base the operating mode of engine 20 on other conditions and/or parameters in addition to those mentioned above. For example, controller 100 may operate engine 20 in the first operating mode, i.e. a conventional diesel cycle, when engine 20 is in a steady state operating condition but is experiencing a light load. When the engine load is light, such as, for example, less than approximately 25% load, the amount of emissions generated by engine 20 may be reduced by operating engine 20 in the first operating mode. One skilled in the art may recognize that the amount of emissions generated by engine 20 may be reduced by operating engine 20 in either the first or second operating modes based on other engine parameters and/or operating conditions. In addition, one skilled in the art may recognize that the performance of engine 20 may be improved by operating engine 20 in either the first or second operating modes based on other engine parameters and/or operating conditions.

As will be apparent from the foregoing description, the present invention provides a method and system for controlling an engine to meet the demands of different operating conditions. The engine may be operated in a first mode when the engine is subject to heavy loads during acceleration or when starting the engine. The first operating mode provides for maximum power output from the engine. The engine may further be operated in a second mode when the engine is experiencing steady state operating conditions. The second mode of operation provides for increased fuel efficiency.

It will be apparent to those skilled in the art that various modifications and variations can be made in the engine control system of the present invention without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method of operating an engine having a cylinder, an intake valve associated with the cylinder and moveable between a first position where the intake valve prevents a flow of fluid relative to the cylinder and a second position where the intake valve allows a flow of fluid relative to the cylinder, a cam assembly connected to the intake valve to move the intake valve between the first and second positions, and a fluid actuator connected to the intake valve, comprising:

sensing at least one operating parameter of the engine;

operating the engine in a first mode wherein the cam assembly begins to move the intake valve from the first position toward the second position when the piston is at or near a top dead center position of an intake stroke and wherein the cam assembly returns the intake valve to the first position when the piston is at or near a bottom dead center position of the intake stroke, the engine operating in the first mode in response to the sensed operating parameter being at one of a predetermined first set of conditions; and operating the engine in a second mode wherein the cam assembly begins to move the intake valve from the first position toward the second position when the piston is at or near a top dead center position of an intake stroke and wherein the fluid actuator prevents the intake valve from returning to the first position in response to the cam assembly, the engine operating in the second mode in response to the sensed operating parameter being at one of a predetermined second set of conditions.

2. The method of claim 1, wherein the engine includes a crankshaft coupled to the cam assembly and the piston, the piston reaches the top dead center position of the intake stroke after the crankshaft rotates through about 360°, and the piston reaches the bottom dead center position of the intake stroke after the crankshaft rotates through about 540°.

3. The method of claim 2, wherein the actuator releases the intake valve after the crankshaft has rotated through at least 550° when the engine is operating in the second mode.

4. The method of claim 3, wherein the intake valve returns to the first position after the crankshaft has rotated through at least 590°.

5. The method of claim 2, wherein the intake valve returns to the first position before the crankshaft rotates through about 560° when the engine is operating in the first mode.

6. The method of claim 1, wherein the at least one operating parameter of the engine is a rotational speed of the engine.

7. The method of claim 6, further including sensing a second operating parameter of the engine.

8. The method of claim 7, wherein the second operating parameter is a fuel supply rate.

9. The method of claim 1, wherein the second set of operating conditions includes an initial cranking of the engine where a crankshaft is accelerated from a stationary position to between about 150 and 170 rotations per minute.

10. The method of claim 9, wherein the actuator prevents the intake valve from returning to the first position until the piston is at or near the top dead center position of a compression stroke.

11. The method of claim 9, wherein the first mode of engine operation is selected when the rotational speed of the crankshaft is between about 150 and 170 rotations per minute.

12. The method of claim 1, wherein the second set of operating conditions includes a steady state operation of the engine.

13. The method of claim 12, wherein the intake valve is returned to the first position when the piston has completed approximately half of the compression stroke and the engine is operating in the second mode.

14. The method of claim 1, wherein the first set of operating conditions includes a state operation of the engine under a light load.

15. The method of claim 1, wherein the first set of operating conditions includes a transient condition.

16. The method of claim 15, wherein the transient condition is caused by an acceleration of the engine.

17. The method of claim 16, wherein the transient condition is indicated by an increase in an amount of fuel supplied to the engine.

18. An engine, comprising:
an engine block defining a cylinder;
a piston slidably disposed within the cylinder, the piston moveable between a top dead center position and a bottom dead center position;
an intake valve operatively associated with the cylinder and moveable between a first position where the intake valve prevents fluid from flowing relative to the cylinder and a second position where a flow of fluid is allowed to flow relative to the cylinder;
a cam assembly operatively connected to the intake valve to move the intake valve between the first and second positions;
a fluid actuator configured to selectively prevent the intake valve from returning to the first position;
a sensor configured to sense at least one operating parameter of the engine; and
a controller operable to selectively operate the engine in a first mode wherein the cam assembly begins to move the intake valve from the first position toward the second position when the piston is at or near the top dead center position of an intake stroke and wherein the cam assembly returns the intake valve to the first position when the piston is at or near a bottom dead center position of the intake stroke and a second mode wherein the cam assembly begins to move the intake valve from the first position toward the second position when the piston is at or near the top dead center position of an intake stroke and wherein the fluid actuator prevents the intake valve from returning to the first position in response to the cam assembly, the controller selecting one of the first and second modes of engine operation based upon the sensed operating parameter of the engine.

19. The engine of claim 18, further including a crankshaft coupled to the piston, the crankshaft moving the piston to the top dead center position of the intake stroke after the crankshaft rotates through about 360° and moving the piston to the bottom dead center position of the intake stroke after the crankshaft rotates through about 540°.

20. The engine of claim 19, wherein the actuator releases the intake valve after the crankshaft has rotated through at least 550° when the engine is operating in the second mode.

21. The engine of claim 20, wherein the intake valve returns to the first position after the crankshaft has rotated through at least 590° when the engine is operating in the second mode.

22. The engine of claim 20, wherein the cam assembly returns the intake valve to the first position before the crankshaft rotates through about 560° when the engine is operating in the first mode.

23. The engine of claim 19, wherein the sensor senses a rotational speed of the engine.

24. The engine of claim 23, further including a second sensor configured to sense a second operating parameter of the engine.

25. The engine of claim 24, wherein the second sensor senses an amount of fuel supplied to the engine.

26. The engine of claim 18, further including:
a source of fluid in fluid communication with the fluid actuator; and
a control valve disposed between the source of fluid and the fluid actuator and moveable between an open position to allow a flow of fluid from the source of fluid to the fluid actuator and a closed position to prevent the flow of fluid between the source of fluid and the fluid actuator.

27. The engine of claim 26, wherein the controller selectively moves the control valve to the open position to operate the engine in the first mode and the controller selectively moves the control valve to the closed position to operate the engine in the second mode.

28. The engine of claim 26, further including a directional control valve moveable between an open position to allow a flow of fluid to or from the fluid actuator and a closed position to prevent a flow of fluid to or from the fluid actuator.

29. The engine of claim 28, wherein the controller moves the directional control valve to the closed position to hold the at least one intake valve in the open position and the controller moves the directional control valve to the open position to close the at least one intake valve.

30. A method of operating an engine having a cylinder, an intake valve associated with the cylinder and moveable between a first position where the intake valve prevents a flow of fluid relative to the cylinder and a second position where the intake valve allows a flow of fluid relative to the cylinder, a cam assembly connected to the intake valve to move the intake valve between the first and second positions, and an actuator connected to the intake valve, comprising:
sensing at least one operating parameter of the engine;
operating the engine in a first mode wherein the cam assembly begins to move the intake valve from the first position toward the second position when the piston is at or near a top dead center position of an intake stroke, and wherein the cam assembly returns the intake valve to the first position when the piston is at or near a bottom dead center position of the intake stroke, the engine operating in the first mode in response to the sensed operating parameter being at one of a predetermined first set of conditions; and
operating the engine in a second mode wherein the cam assembly begins to move the intake valve from the first position toward the second position when the piston is at or near a top dead center position of an intake stroke, and wherein the actuator holds the intake valve at an intermediate position for a determined period of time, the intermediate position being between the first position and the second position, thereby preventing the intake valve from returning to the first position in response to the cam assembly, the engine operating in the second mode in response to the sensed operating parameter being at one of a predetermined second set of conditions.

31. The method of claim 30, wherein the engine includes a crankshaft coupled to the cam assembly and the piston, the piston reaches the top dead center position of the intake stroke after the crankshaft rotates through about 360°, and the piston reaches the bottom dead center position of the intake stroke after the crankshaft rotates through about 540°.

32. The method of claim 31, wherein the actuator releases the intake valve after the crankshaft has rotated through at least 550° when the engine is operating in the second mode.

33. The method of claim 32, wherein the intake valve returns to the first position after the crankshaft has rotated through at least 590°.

34. The method of claim 31, wherein the intake valve returns to the first position before the crankshaft rotates through about 560° when the engine is operating in the first mode.

35. The method of claim 30, wherein the at least one operating parameter of the engine is a rotational speed of the engine.

36. The method of claim 35, further including sensing a second operating parameter of the engine.

37. The method of claim 36, wherein the second operating parameter is a fuel supply rate.

38. The method of claim 30, wherein the second set of operating conditions includes one of a steady state operation of the engine and an initial cranking of the engine where a crankshaft is accelerated from a stationary position to between about 150 and 170 rotations per minute.

39. The method of claim 38, wherein the actuator prevents the intake valve from returning to the first position until the piston is at or near the top dead center position of a compression stroke.

40. The method of claim 38, wherein the first mode of engine operation is selected when the rotational speed of the crankshaft is between about 150 and 170 rotations per minute.

41. The method of claim 38, wherein the intake valve is returned to the first position when the piston has completed approximately half of the compression stroke and the engine is operating in the second mode.

42. The method of claim 30, wherein the first set of operating conditions includes one of a state operation of the engine under a tight load and a transient condition.

* * * * *